US008245363B2

(12) United States Patent
Glasser

(10) Patent No.: US 8,245,363 B2
(45) Date of Patent: Aug. 21, 2012

(54) MULTI-ITEM HOLDER DEVICE

(76) Inventor: Jerome Glasser, Alexandria, VA (US)

( * ) Notice: Subject to any disclaimer, the term of this patent is extended or adjusted under 35 U.S.C. 154(b) by 0 days.

(21) Appl. No.: 12/929,595

(22) Filed: Feb. 3, 2011

(65) Prior Publication Data

US 2011/0168602 A1 Jul. 14, 2011

Related U.S. Application Data

(62) Division of application No. 10/715,669, filed on Nov. 18, 2003, now Pat. No. 7,908,718.

(51) Int. Cl.
*A44B 99/00* (2010.01)
*F16B 7/04* (2006.01)

(52) U.S. Cl. ................ 24/304; 24/335; 24/336; 24/545; 403/170; 403/174; 446/111

(58) Field of Classification Search .................... 24/335, 24/545, 304, 336
See application file for complete search history.

(56) References Cited

U.S. PATENT DOCUMENTS

| | | | | | |
|---|---|---|---|---|---|
| 1,686,106 | A | * | 10/1928 | Saives | 404/40 |
| 4,054,393 | A | * | 10/1977 | Talleri | 403/174 |
| 4,074,492 | A | * | 2/1978 | Simpson et al. | 52/419 |
| 4,365,454 | A | * | 12/1982 | Davis | 52/578 |
| 4,520,606 | A | * | 6/1985 | Francovitch | 52/410 |
| 4,673,152 | A | * | 6/1987 | Brown | 248/216.1 |
| 4,793,725 | A | * | 12/1988 | Cheng | 403/174 |
| 4,837,953 | A | * | 6/1989 | Tannenbaum | 40/124 |
| 4,860,514 | A | * | 8/1989 | Kelly | 52/410 |
| 5,121,526 | A | * | 6/1992 | Burkard et al. | 24/336 |
| D404,942 | S | * | 2/1999 | Laib | D6/510 |
| 6,669,036 | B1 | * | 12/2003 | Yang et al. | 211/181.1 |

* cited by examiner

*Primary Examiner* — Robert J Sandy

(57) ABSTRACT

Inexpensively manufactured device permits the holding, typically for display purposes, of at least one item, but preferably multiple items such as trading cards or photographs, in a manner offering an unobstructed view of the items.

2 Claims, 5 Drawing Sheets

MULTI-ITEM HOLDER DEVICE

CROSS REFERENCES TO RELATED APPLICATIONS

This application is a division of application Ser. No. 10/715,669 filed Nov. 18, 2003 now U.S. Pat. No. 7,908,718.

FIELD OF THE INVENTION

This invention relates to devices for displaying essentially flat, relatively lightweight photographs, cards, artwork, electronic screens, and/or decorative items.

BACKGROUND OF THE INVENTION

Collecting has become an ingrained part of the American culture. Some of the best known types of collectibles are playing cards and sports trading cards. Because collectibles are, naturally, often valuable, there has developed an industry offering numerous products which can protect collections in a manner that is considered at the same time both professional and inexpensive. However, the concept of "protection" within this industry is generally considered synonymous with "storage." The majority of protective means and devices that have been made available to consumers for their collections, whether expensive or inexpensive, have been designed to protect items in secured, non-readily-visible storage. The emphasis on protection has not, to the contrary, been geared towards providing for the showcasing of collectibles for easy viewing on a wall, for example, the way that posters and artwork are typically displayed. Collection holders/protectors, ranging from cheap to expensive, are most commonly designed with the intention that collectible items will be stored in drawers, closets or safes. In the event that actual display of a collection is desired, a collector will usually go to a professional frame-maker and make a large financial investment in a display frame ore case.

One of the primary disadvantages of this method, apart from the obvious high cost, is that these usually custom-made display frames and cases most often only showcase a few of the choicest items in a collection. For instance, in the case of a trading card collection, only the most valuable or attractive cards are usually placed under one solid sheet of glass or protective-coated translucent plastic and these can not easily be re-arranged without taking apart the professionally made frame/case, which is characteristically not designed to be opened.

While it is true that some inexpensive card display systems do exist in the form of transparent vinyl sheets having pockets to hold cards, these have distinct disadvantages as they: a) entirely encase, and therefore cover, the card making viewing of the card less aesthetically pleasing; b) limit to a pre-determined and fixed number (usually 9, 12, or 16) the number of cards that can be inserted into the sheet pockets; c) are not designed to form an attractive, inter-linking display of the pockets which would permit an entire, large collection to be showcased in a professional manner; d) are fixed in size, which means that: in the instance when a card is much smaller than the pocket size, these sheets offer an unattractive display, and in the instance when the card is even just slightly larger than the pockets, the sheets become entirely useless. Such card display sheets, moreover, are generally entirely unsuited to displaying other collectibles, such as photographs, since conventional sizing of trading cards and, for instance, photographs, is different.

The primary alternate option for displaying cards and photographs is the traditional push-pin/thumbtack & cork bulletin-board method. Yet another display alternative is the traditional affixing of tape or supposedly "removable" poster tack/gum to the card or photograph which subsequently gets applied directly onto a wall. Most collectors find these methods to be bad for both the wall and/or for the display items themselves. Magnets are also relied upon to hold display items, but their use is almost exclusively confined to refrigerators or magnetically-painted walls. Magnets have the disadvantage that they cover a portion of the image in an unsightly manner. The same is true for another method which has gained slightly in popularity during the past decade—but only slightly—that being a rigid-backed board in conjunction with criss-crossing ribbons into which, typically, photographs are displayed. The disadvantages of covering a portion of the display item are significant since important information may be obscured.

None of the prior art recognizes the need to solve the problem of displaying multiple items, potentially items of differing sizes, and particularly, of displaying multiple items in a manner that does not significantly limit the number of display items; none of the prior art discloses integrally molding an increased slope to increase tension useful towards increasing the holding pressure exerted on display item(s); none of the prior art discloses the advantage of having a transparent upper plate to provide an unobscured view of the display item(s); obviously, the application of prior art towards multi-item displays has never been conceived of prior to the object of this invention, otherwise its commercial success already would have been established.

In U.S. Pat. No. 6,018,849 to ROYER, an improved device for grasping and holding together a group of papers is disclosed which is specifically designed for holding together a group of papers in the manner of a traditional paper clip. This clip offers on one sole section for grasping papers. Moreover, one of the objects indicates that Royer was only addressing his device towards groups of papers and the need to have the edges of the papers aligned flush to each other, on top of another. An object of the subject invention states that it is to provide an improved device for grasping together otherwise loose papers in a manner so that the sides and top of edges of paper members are substantially aligned and even with one another. Royer does not justify the reasoning behind which such an effect is desirable, but it may be inferred that the application of the object of this invention was not for display. The reason for this inference is that most often papers grouped together are for storage, which only makes sense since any papers following the top sheet are not usually visible.

U.S. Pat. No. 5,179,765 to SUNGBERG discloses the concept of a paper clip as a key ring item. Considering that few people typically walk around holding their keys with papers dangling for their key ring, and further, considering that even one or two keys would be too heavy for the pressure of the clip to maintain its contact with papers to which the keys and clip would be attached, this invention seems particularly impractical. As a per-clipping item separate and apart from its use in coordination with a key-ring concept, this clip notion is entirely obvious to one skilled in the art.

U.S. Pat. No. 5,544,436 to LEFKOWITZ discloses an apparatus for simultaneously displaying a plurality of photographs, pictures, cards, and the like. However, as is typical of prior art in this field, the number of display panels are fixed in a relatively expensive frame.

U.S. Pat. No. 6,490,818 to BRAMHALL discloses a frame having moveably sliding "carriers" which slide within a framework. The number of display panels, in this prior art invention are fixed in a relatively expensive frame.

There is a need for an inexpensively produced device which can display items including, but not limited to, trading cards, playing cards or photographs, electronic viewscreens, or most any other type of relatively thin item to be displayed in an attractive manner; one which can accommodate virtually any size display item, and that can hold a potentially limitless number of display items without damaging the items in ways that push pins/thumb tacks and tape do, and also which will not obscure the item being held. In addition, there is a need for a device/system which requires only basic instructions in order for it to be easily used.

These and other objects and advantages of the invention will become more apparent from the following detailed description and claims.

SUMMARY AND OBJECTS OF THE INVENTION

The present invention is a device/system which provides for the easy and inexpensive displaying of items such as, but not limited to, artwork, trading cards, photographs and electronic viewscreens. An object of this invention is to provide a device/system which is/are simple and inexpensive to manufacture.

Another object of this invention is to provide a simple-to-use device/system requiring little training to use, yet which still affords a uniform, professional display appearance, paramount among which is the characteristic that the display items are aligned to one another by means of an alignment guide.

Yet another object of the present invention is to provide a device/display system which permits substantially the entire image of the item(s) being displayed to be seen. One means of achieving this result is through the use of a transparent holding element which affords an unobscured view of the display item being held.

Yet still another, further object of this invention is to provide for the potentially unlimited number of display items to be interconnected.

A still further, additional object of this invention is to provide a display device which can be "set-up" and taken down relatively easily and quickly and which may be easily transported.

A yet still further object of this invention is to provide a display system which can be relatively easily secured to a wall or other such display area without damage to item or wall.

Figure 1:
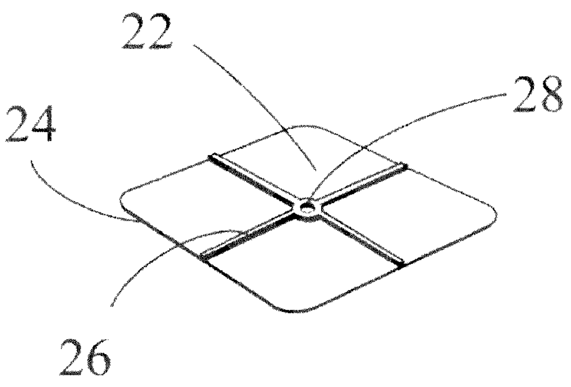
FIG. 1 is a perspective view of an embodiment having center tack hole which can align 4 display items.
Figure 2:
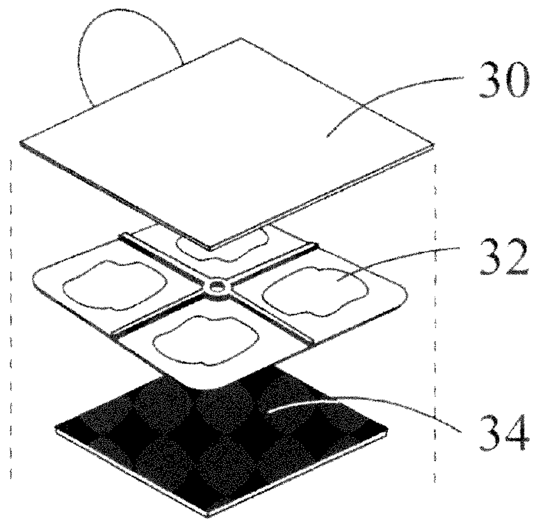
FIG. 2 is a detailed view of the embodiment of FIG. 1 also displaying glue or adhesive for holding a display item in place, a removable covering for the glue and a magnet which can be affixed to the back surface.
Figure 3:
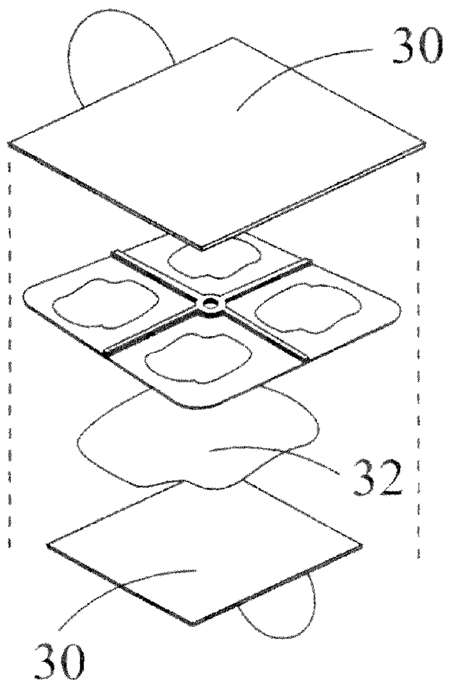
FIG. 3 is a detailed view of the embodiment of FIG. 1 also displaying glue for holding a display item in place, a removable covering for the glue and more glue for the back surface and a removable covering for the back surface glue.
Figure 4:
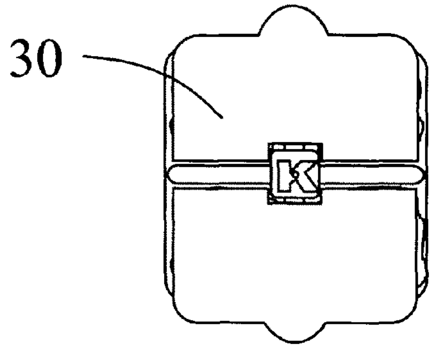
FIG. 4 is a front view of an embodiment for holding an item in place, two separate, removable coverings for glue or adhesive applied to the face of the embodiment, an advertising logo for displaying brand indicia, and having a tack hole.
Figure 5:
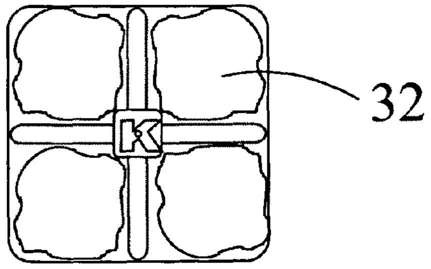
FIG. 5 is a front view of the FIG. 4 embodiment with the glue covering tabs removed, thereby displaying the surface glue.
Figure 6:
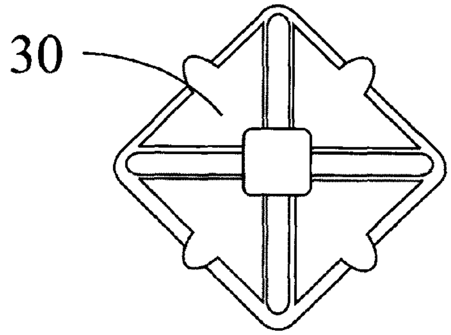
FIG. 6 displays a front view of yet another configuration for removable covering tabs for surface glue.
Figure 7:
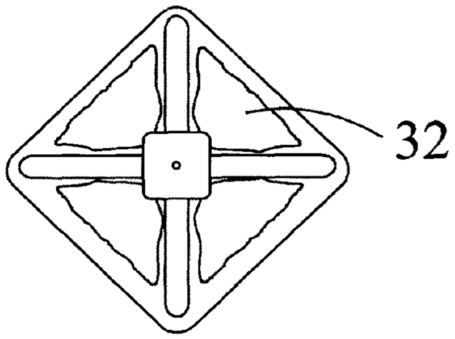
FIG. 7 displays a front view of FIG. 6 configuration with the glue covering tabs removed, thereby displaying the surface glue or adhesive.
Figure 8:
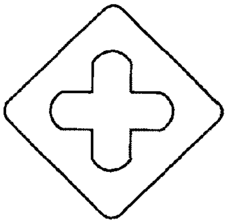
FIG. 8 is a front view of another embodiment whose support arms do not extend as far as those as displayed in FIGS. 4-7.
Figure 9:
FIG. 9 is a side view of FIG. 8.
Figure 10:
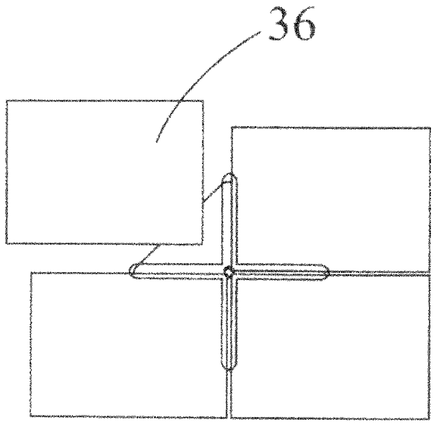
FIG. 10 is a front view of an embodiment in use displaying the last stage of use for one of the devices and the device in this instance is translucent.
Figure 11:
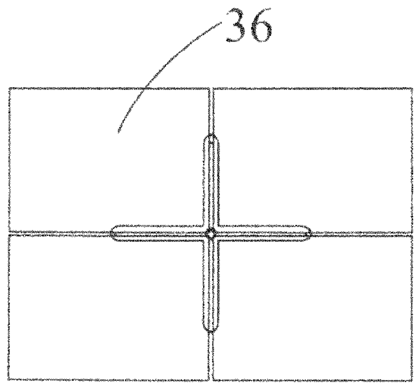
FIG. 11 is yet another front view of the translucent embodiment of FIG. 10 with all display items in use.
Figure 12:
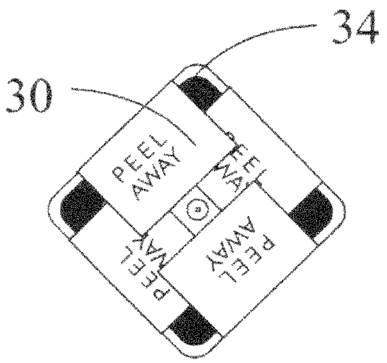
FIG. 12 is a view of the back of an embodiment having glue covers folded over a magnet attached to the embodiment's back surface.
Figure 13:
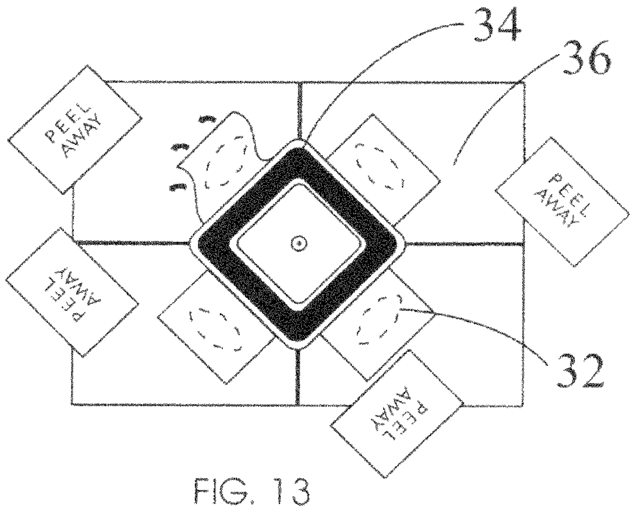
FIG. 13 is a view of the back of the embodiment of FIG. 12 in operation with the glue covers removed, the glue contacting the back surface of the display items, and the magnet exposed for use.
Figure 14:
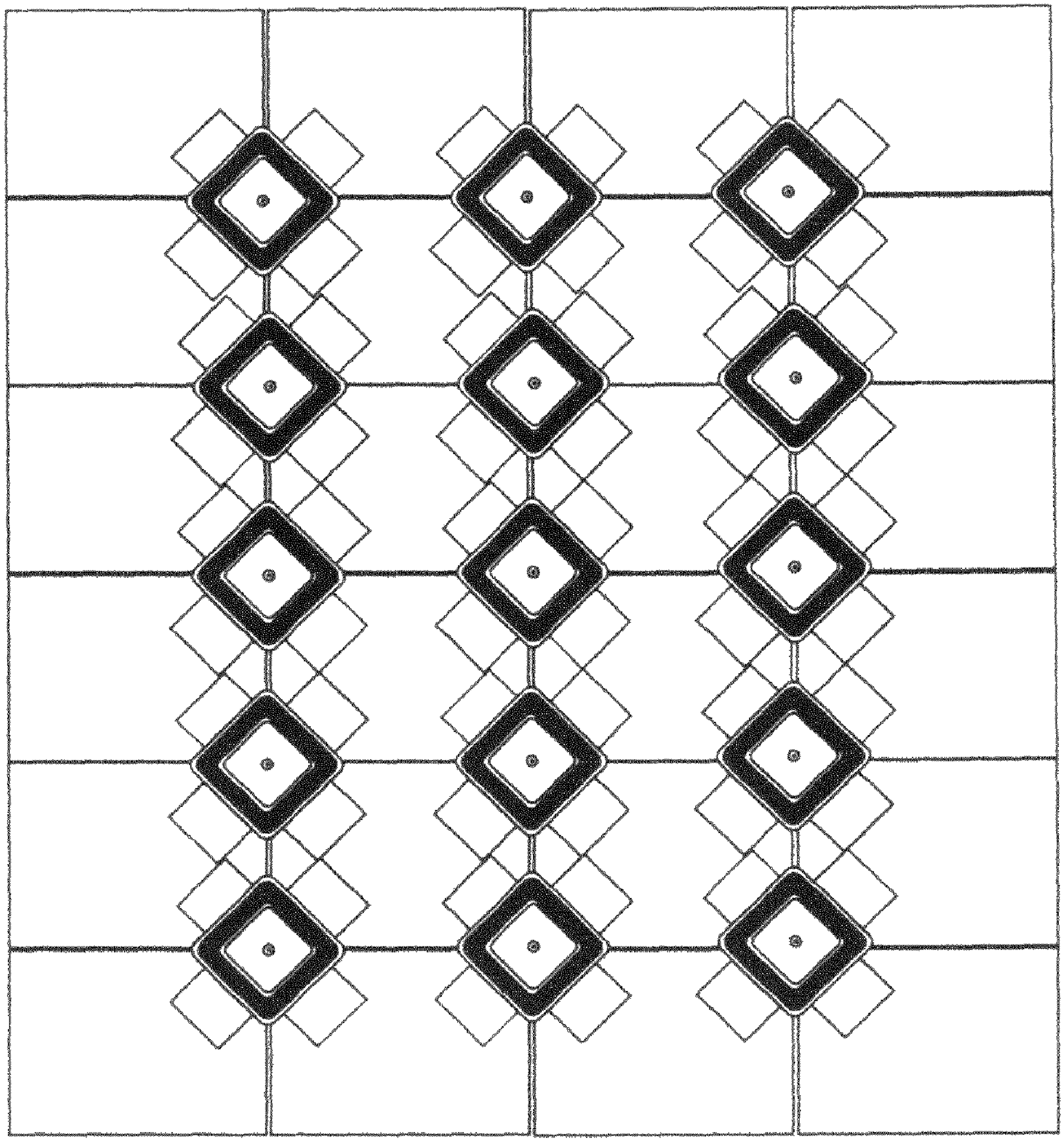
FIG. 14 is a frontal view of the back of multiple items of the embodiment of FIG. 13 in coordinated use.
Figure 15:
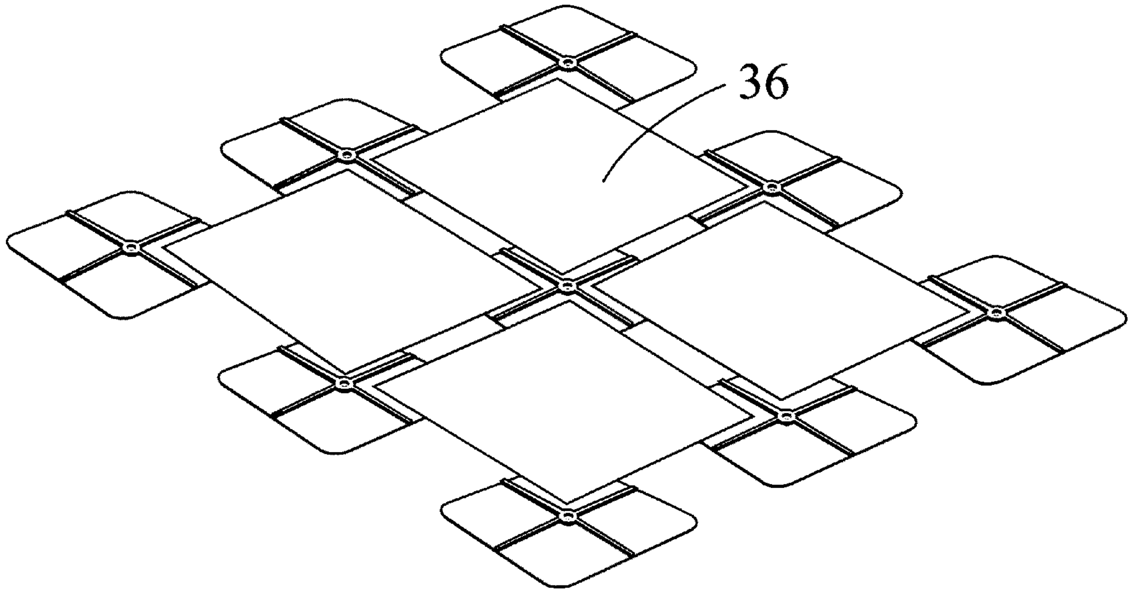
FIG. 15 is a perspective view of the front of an embodiment in coordinated use for displaying items.

| | |
|---|---|
| Front Surface 22 | Glue Cover 30 |
| Back Surface 24 | Glue 32 |
| Rib 26 | Magnet 34 |
| Tack Hole 28 | Display Item 36 |

DESCRIPTION OF THE PREFERRED EMBODIMENT

In a preferred embodiment, an item is molded in transparent plastic having a Front Surface 22 and a Back Surface 24. A central a hole, Tack Hole 28, is made during the injection-molding process, or it may be conventionally drilled in a manner well-known in the art. Tack Hole 28 should be wide enough to easily accommodate the insertion of a traditionally sized thumbtack. Tack Hole 28 may be obviated, if so desired, in other embodiments in which, for example, the center area of the device may display a stamped/embossed/etched/imprinted brand logo/indicia.

If the invention of this device is to be manufactured through an injection molding process, prior to molding or extruding the device of this invention, a traditional, common, conventional plastic pelletized resin is obtained.

Rib 26 in a cruciform embodiment, or if only one Rib 26 is used to create a mere two alignment areas, serves to permit the perfect alignment between multiple display items. It may be integrally molded into the surface of Front Surface 22. Alternatively, in another embodiment, Rib 26, or multiple Ribs 26 may further be molded both onto Front Surface 22 and also onto Back Surface 24. It may, alternatively be glued or sonically welded onto a flat sheet of stamped plastic, or even made entirely from stamped metal, such as brass or aluminum.

Glue Cover 30, which preferably is made of paper or plastic, is used as a removable covering for Glue 32. Glue 32 is used for keeping a Display Item 36 in contact with Front Surface 22. Magnet 34 is made of conventional magnetic sheeting and may be attached to an embodiment of Back Surface 24 using conventional glue or adhesive.

While the preferred embodiment of the present invention has been described and illustrated, it is understood by one skilled in the art that the preferred embodiment is capable of variation, addition, omission and modification without departing from the spirit and scope of the invention.

The invention claimed is:

1. A device for holding a plurality of items for display, comprising:

a substantially planar member having a front surface and a back surface;

at least two substantially straight and smooth edges having a pre-determined thickness and lying at 90-degree right angles in perpendicular relation to each other, thereby forming a cross-shaped configuration having a central hub and extending radially outward therefrom, in perpendicular contact with the front surface of said substantially planar member;

and an adhesive on the front surface of said substantially planar member having said at least two substantially straight and smooth edges.

2. The device for holding a plurality of items for display of claim 1, wherein:

said at least two substantially straight and smooth edges are integrally molded into said substantially planar member;

said central hub has a hole;

on a surface of said substantially planar member, a magnet element;

covering means for said adhesive to prolong adhesive efficacy until use is desired.

* * * * *